United States Patent [19]

Hergenrother et al.

[11] Patent Number: 5,151,469
[45] Date of Patent: Sep. 29, 1992

[54] METHOD OF PREPARING ELASTOMERS HAVING REDUCED HYSTERESIS PROPERTIES WITH SULFOXIDES

[75] Inventors: William L. Hergenrother, Akron; John M. Doshak, Mogadore, both of Ohio

[73] Assignee: Bridgestone Corporation, Tokyo, Japan

[21] Appl. No.: 703,533

[22] Filed: May 21, 1991

[51] Int. Cl.⁵ .......................... C08F 8/34; C08C 19/20
[52] U.S. Cl. ..................................... 525/354; 524/495
[58] Field of Search ......................................... 525/354

[56] References Cited

U.S. PATENT DOCUMENTS

| | | | |
|---|---|---|---|
| 3,177,190 | 4/1965 | Hsieh | 526/175 |
| 3,426,006 | 2/1969 | Nutzel et al. | |
| 4,015,061 | 3/1977 | Schulz et al. | 526/178 |
| 4,026,865 | 5/1977 | Uraneck et al. | |
| 4,414,372 | 11/1983 | Farnham et al. | 526/190 |
| 4,429,091 | 1/1984 | Hall | 526/181 |
| 4,614,771 | 9/1986 | Watanabe et al. | 525/351 |
| 4,616,069 | 10/1986 | Watanabe et al. | 525/370 |
| 4,736,003 | 4/1988 | Schneider et al. | 526/190 |

FOREIGN PATENT DOCUMENTS

| | | |
|---|---|---|
| 0282437 | 9/1988 | European Pat. Off. |
| 0290883 | 11/1988 | European Pat. Off. |
| 0316255 | 5/1989 | European Pat. Off. |
| 247455 | 7/1987 | German Democratic Rep. |
| 2117778 | 10/1983 | United Kingdom |

OTHER PUBLICATIONS

"Anionic Polymerization Initiators Containing Protected Functional Groups and Functionally Terminated Diene Polymers" Journal of Polymer Science Polymer Chemistry Edition, vol. 12, pp. 153–166 by Schultz et al.
"Specific Functionalization of Polymers by Carboxyl Groups", Makromal Chem. 179, 1978, pp. 1383–1386 by Broze et al.
"3-Dimethylaminoproply-Lithium—An Analytical and Kinetic Investigation of a New Inititator System for Polymer Synthesis" European Polymer Journal vol. 11, 1975, pp. 699–704 by Eisenback et al.

Primary Examiner—Christopher Henderson
Attorney, Agent, or Firm—Frank J. Troy, Sr.

[57] ABSTRACT

A method of preparing an elastomer having reduced hysteresis properties comprises the steps of reacting an anionic polymer having at least one functional site, with about one equivalent of a sulfoxide compound having the formula

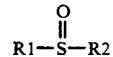

to form an adduct, where R1 and R2 are organo groups selected from the group consisting of alkyls and sulfur substituted alkyls having from about 1 to about 20 carbon atoms, cycloalkyls having from about 3 to about 20 carbon atoms, aryls and halogen substituted aryls having from about 6 to about 20 carbon atoms and aralkyls having from about 7 to about 20 carbon atoms; and, curing the adduct in the presence of a suitable cure catalyst. Articles such as tires, produced with low hysteresis elastomeric polymers have lower rolling resistance.

9 Claims, No Drawings

METHOD OF PREPARING ELASTOMERS HAVING REDUCED HYSTERESIS PROPERTIES WITH SULFOXIDES

TECHNICAL FIELD

The subject invention relates to anionic polymerization of diene polymer and copolymer elastomers. More specifically, the present invention relates to polymerization including endcapping of the polymer with a sulfur containing compound.

Diene polymers and copolymers, prepared according to the present invention, have reduced hysteresis characteristics after endcapping and even further reduced hysteresis characteristics upon cure of the elastomer. Articles such as tires, power belts and the like which are prepared from these polymers exhibit increased rebound, decreased rolling resistance and less heat build-up during mechanical stress operations.

BACKGROUND ART

In the art, it is desirable to produce elastomeric compounds exhibiting reduced hysteresis. Such elastomers, when compounded to form articles such as tires, power belts and the like, will show an increase in rebound, a decrease in rolling resistance and will have less heat build-up when mechanical stresses are applied.

The main source of hysteretic power loss has been established to be due to the section of the polymer chain from the last cross link of the vulcanized to the end of the polymer chain. This free end cannot be involved in an efficient elastically recoverable process, and as a result, any energy transmitted to this section of the cured sample is lost as heat. It is known in the art that this type of mechanism can be reduced by preparing higher molecular weight polymers which will have fewer end groups. However, this procedure is not useful because processability of the rubber with compounding ingredients and during shaping operations decreases rapidly with increasing molecular weight.

Another method of reducing hysteresis has been to react a lithium endcapped elastomer with a tin chloride compound to give a polymer terminated with a tin compound. Tin has an affinity for carbon-black, which affinity reduces hysteresis by removing the effect of a free end. The present invention makes use of endcapped polymers which provide for even further reduction of hysteresis during the curing of the elastomer.

Other additives have been used to react with the carbon-lithium bond to reduce hysteresis characteristics. These have included heavy metal compounds and other organic compounds containing polar groups such as amines, amides, esters, ketones and various combinations thereof.

The present invention provides novel elastomers endcapped with a sulfoxide containing compound. The sulfur containing group of the endcapped elastomer can react with the carbon black or with another polymer backbone during cure of the elastomer, effectively reducing the number of end groups available to cause hysteresis.

DISCLOSURE OF THE INVENTION

It is therefore, an object of the present invention to provide elastomers having reduced hysteresis characteristics.

It is a further object of the present invention to provide a method of preparing elastomers having reduced hysteresis characteristics.

It is another object of the present invention to provide a vulcanizable elastomeric compound having reduced hysteresis characteristics.

It is still a further object of the present invention to provide an elastomer endcapped with a sulfoxide containing compound.

Still another object of the present invention is to provide an improved tire having decreased rolling resistance.

These and other objects together with the advantages thereof over the existing art, which shall become apparent from the specification which follows, are accomplished by the invention as hereinafter described and claimed.

In general, a method of preparing an elastomer having reduced hysteresis properties comprises the steps of reacting an anionic polymer having at least one functional site, with about one equivalent of a sulfoxide compound having the formula

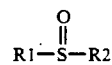

to form an adduct. R1 and R2 are organo groups selected from the group consisting of alkyls and sulfur substituted alkyls having from about 1 to about 20 carbon atoms, cycloalkyls having from about 3 to about 20 carbon atoms, aryls and halogen substituted aryls having from about 6 to about 20 carbon atoms and aralkyls having from about 7 to about 20 carbon atoms. The method also comprises the step of curing the adduct in the presence of a suitable cure catalyst.

An elastomer according to the present invention and having decreased hysteresis properties upon curing comprises the reaction product of an anionic polymer having at least one functional site and a sulfoxide compound having the formula

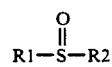

where R1 and R2 are organo groups selected from the group consisting of alkyls and sulfur substituted alkyls having from about 1 to about 20 carbon atoms, cycloalkyls having from about 3 to about 20 carbon atoms, aryls and halogen substituted aryls having from about 6 to about 20 carbon atoms and aralkyls having from about 7 to about 20 carbon atoms.

A vulcanizable elastomeric compound having reduced hysteresis characteristics upon vulcanization comprises the reaction product of an anionic polymer having at least one functional site and a sulfoxide compound having the formula

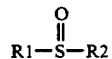

where R1 and R2 are organo groups selected from the group consisting of alkyls and sulfur substituted alkyls having from about 1 to about 20 carbon atoms, cycloalkyls having from about 3 to about 20 carbon atoms, aryls and halogen substituted aryls having from about 6 to about 20 carbon atoms and aralkyls having from about 7 to about 20 carbon atoms. The vulcanizable elastomeric compound also comprises from about 20 to about 100 parts by weight of carbon black, per 100 parts of the reaction product.

An improved tire having decreased rolling resistance resulting from a treadstock containing a vulcanizable elastomeric compound which comprises the reaction product of an anionic polymer having at least one functional site and a sulfoxide compound having the formula

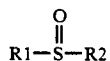

where R1 and R2 are organo groups selected from the group consisting of alkyls and sulfur substituted alkyls having from about 1 to about 20 carbon atoms, cycloalkyls having from about 3 to about 20 carbon atoms, aryls and halogen substituted aryls having from about 6 to about 20 carbon atoms and aralkyls having from about 7 to about 20 carbon atoms. The vulcanizable elastomeric compound of the improved tire also comprises from about 20 to about 100 parts by weight of carbon black, per 100 parts of the reaction product.

PREFERRED EMBODIMENT FOR CARRYING OUT THE INVENTION

As will become apparent from the description which follows, the present invention provides novel elastomer polymers endcapped with a sulfur containing compound. It has been discovered herein that vulcanizable elastomeric compounds and articles thereof based upon such endcapped elastomer polymers exhibit useful properties, particularly the property of reduced hysteresis. When compounded to make products such as tires, power belts and the like, these vulcanizable elastomeric compounds exhibit increased rebound, decreased rolling resistance and less heat build-up during periods of applied mechanical stress.

The elastomer polymers according to the present invention are any anionically-polymerized elastomer, e.g., polybutadiene, polyisoprene and the like, and copolymers thereof with monovinyl aromatics such as styrene, alpha methyl styrene and the like, or trienes such as myrcene. Thus, the elastomers include diene homopolymers and copolymers thereof with monovinyl aromatic polymers. Suitable monomers for forming elastomers of the present invention include conjugated diolefins having from about 4 to about 12 carbon atoms and monovinyl aromatic monomers having 8 to 18 carbon atoms and trienes. Examples of conjugated diene monomers and the like useful in the present invention include 1,3-butadiene, isoprene, 1,3-pentadiene, 2,3-dimethyl-1,3-butadiene and 1,3-hexadiene, and aromatic vinyl monomers include styrene, alpha-methylstyrene, p-methylstyrene, vinyltoluene and vinylnaphthalene. The conjugated diene monomer and aromatic vinyl monomer are normally used at the weight ratios of 95–50:5–50, preferably 95–65:5–35.

The elastomer polymer results from an anionic polymerization employing any suitable anionic polymerization initiator and resulting in a living polymer having at least one functional site. For example, one preferred initiator is butyl lithium which results in an elastomer having a carbon-lithium bond. Other examples of useful polymerization initiators include s-butyl lithium, t-butyl lithium, allyl lithium, methyl lithium, dodecyl lithium, tributyl tin lithium, and the like.

Polymerization is usually conducted in a conventional solvent for anionic polymerizations such as hexane, cyclohexane, benzene and the like. Other techniques for polymerization, such as semi-batch and continuous polymerization may be employed. In order to promote randomization in copolymerization and to control vinyl content, a polar coordinator may be added to the polymerization ingredients. The amount depends on the amount of vinyl desired, the level of styrene employed and the temperature of the polymerization, as well as the nature of the specific polar coordinator (modifier) employed.

Compounds useful as polar coordinators include those having an oxygen or nitrogen hetero-atom and a non-bonded pair of electrons. Examples include dialkyl ethers of mono and oligo alkylene glycols; "crown" ethers; tertiary amines such as tetramethylethylene diamine (TMEDA), N-N'-dimethylpiperazine, and tributylamine; tetrahydrofuran (THF), linear and cyclic oligomeric oxolanyl alkanes such as 2-2'-di(tetrahydrofuryl) propane, di-piperidyl ethane, hexamethylphosphoramide, diazabicyclooctane, dimethyl ether, diethyl ether, and the like.

A batch polymerization is begun by charging a blend of monomer(s) and solvent to a suitable reaction vessel, followed by the addition of the polar coordinator (if employed) and the initiator compound previously described. The reactants are heated to a temperature of from about 0° C. to about 200° C., and the polymerization is allowed to proceed for from about 0.1 to about 24 hours.

The polymer is then terminated or "endcapped" by the addition of a sulfoxide compound having the general formula

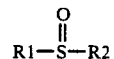

where the organic moieties R1 and R2 are selected from the group consisting of alkyls and sulfur substituted alkyls having from about 1 to about 20 carbon atoms, cycloalkyls having from about 3 to about 20 carbon atoms, aryls and halogen substituted aryls having from about 6 to about 20 carbon atoms and aralkyls having from about 7 to about 20 carbon atoms. Typical alkyls include n-butyl, s-butyl, methyl, ethyl, isopropyl and the like. The cycloalkyls include cyclohexyl, menthyl and the like. The aryl and aralkyl groups include phenyl, benzyl and the like. Other useful sulfoxides include dimethyl sulfoxide, diethyl sulfoxide, dicyclohexyl sulfoxide, methyl methylsulfinylmethyl sulfide, bis 2-methyl phenyl sulfoxide, bis 3-methyl phenyl sulfoxide, bis 4-methyl phenyl sulfoxide, bis 2,4-dimethyl phenyl sulfoxide, bis 2-methyl cyclohexyl sulfoxide, bis 3-methyl cyclohexyl sulfoxide, bis 4-methyl cyclohexyl sulfoxide, phenyl methyl sulfoxide, 1-naphthyl sulfoxide, 2-naphthyl sulfoxide, bis 2,4-dimethyl phenyl sulfoxide, phenyl naphthyl sulfoxide, bis methyl cyclohexyl sulfoxide and the like. Particularly preferred sulfoxides are dibutyl sulfoxide, methyl methylsulfinylmethyl sulfide and the aryl sulfoxides which include diphenyl sulfoxide, di-para-tolyl sulfoxide, and di-4-chlorophenyl sulfoxide. R1 and R2 may be the same or different organo groups. It is preferred to react about one equivalent of the sulfoxide compound with the anionic polymer.

The endcapped polymer may be separated from the solvent by conventional techniques. These include steam or alcohol coagulation, thermal desolventization, or any other suitable method. Additionally, solvent may be removed from the resulting polymer by drum drying, extruder drying, vacuum drying or the like.

It is believed that the endcapped polymers according to the present invention react predominately during cure with carbon black rather than during mixing like those polymers prepared with those conventional endcapping agents heretofore known in the art. It is further believed that the sulfur containing end group of the prepared polymer can react with the polymer backbone of other polymers in the cure compound during the cure procedure, and thus effectively reduces the number of free end groups. Because free end groups cause an increase in hysteresis, the present invention effectively reduces hysteresis.

The polymers of the present invention can be used alone or in combination with other elastomers to prepare a tire treadstock compound. For example, they can be blended with any conventionally employed treadstock rubber which includes natural rubber, synthetic rubber and blends thereof. Such rubbers are well known to those skilled in the art and include synthetic polyisoprene rubber, styrene/butadiene rubber (SBR), polybutadiene, butyl rubber, Neoprene, ethylene/propylene rubber, ethylene/propylene/diene rubber (EPDM), acrylonitrile/butadiene rubber (NBR), silicone rubber, the fluoroelastomers, ethylene acrylic rubber, ethylene vinyl acetate copolymer (EVA), epichlorohydrin rubbers, chlorinated polyethylene rubbers, chlorosulfonated polyethylene rubbers, hydrogenated nitrile rubber, tetrafluoroethylene/propylene rubber and the like. When the polymers of the present invention are blended with conventional rubbers, the amounts can vary widely such as between 10 and 99 percent by weight, depending upon the amount of hysteresis reduction desired.

The polymers can be compounded with carbon black in amounts ranging from about 20 to about 100 parts by weight, per 100 parts of rubber (phr), with about 40 to about 70 phr being preferred. The carbon blacks may include any of the commonly available, commercially-produced carbon blacks but those having a surface area (EMSA) of at least 20 $m^2$/gram and more preferably at least 35 $m^2$/gram up to 200 $m^2$/gram or higher are preferred. Surface area values used in this application are those determined by ASTM D-1765 using the cetyltrimethyl-ammonium bromide (CTAB) technique. Among the useful carbon blacks are furnace black, channel blacks and lamp blacks. More specifically, examples of the carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. See, for example, *The Vanderbilt Rubber Handbook*, pp 408–424, R T Vanderbilt Co., Norwalk, Conn. 06855 (1979). Other carbon blacks which may be utilized include acetylene blacks. Mixtures of two or more of the above blacks can be used in preparing the products of the invention. Typical values for surface areas of usable carbon blacks are summarized in the following Table I.

TABLE I

| Carbon Blacks | |
|---|---|
| ASTM Designation (D-1765-82a) | Surface Area ($m^2$/g) (D-3765) |
| N-110 | 126 |
| N-220 | 111 |
| N-339 | 95 |
| N-330 | 83 |
| N-550 | 42 |
| N-660 | 35 |

The carbon blacks utilized in the preparation of the rubber compounds of the invention may be in pelletized form or an unpelletized flocculent mass. Preferably, for more uniform mixing, unpelletized carbon black is preferred. The reinforced rubber compounds can be cured in a conventional manner with known vulcanizing agents in amounts of from about 0.5 to about 4 phr. For example, sulfur or peroxide-based curing systems may be employed. For a general disclosure of suitable vulcanizing agents one can refer to Kirk-Othmer, *Encyclopedia of Chemical Technology*, 3rd ed., Wiley Interscience, N.Y. 1982, Vol. 20, pp. 365–468, particularly "Vulcanization Agents and Auxiliary Materials" pp. 390–402. Vulcanizing agents may be used alone or in combination.

Vulcanizable elastomeric compositions of the invention can be prepared by compounding or mixing the polymers thereof with carbon black and other conventional rubber additives such as fillers, plasticizers, antioxidants, curing agents and the like, using standard rubber mixing equipment and procedures and conventional amounts of such additives. Such elastomeric compounds when vulcanized using conventional rubber vulcanization conditions have reduced hysteresis properties and are particularly adapted for use as tread rubbers for tires having reduced rolling resistance.

GENERAL EXPERIMENTAL

In order to demonstrate the preparation and properties of elastomers prepared according to the present invention, a styrene/butadiene rubber (SBR) was prepared employing a suitable polymerization initiator, as will be more fully discussed hereinbelow. A control sample of the prepared polymer was isolated, and the remaining polymer was endcapped with a sulfoxide compound according to the invention. As noted above, various techniques known in the art for carrying out polymerizations may be employed without departing from the scope of the present invention.

Both the control and the invention polymer samples of each example were then tested for tensile strength (psi), percent elongation, Mooney viscosity at 100° C., tan delta (at both 24° C. and 65° C.), and the change in tan delta of the invention polymer as compared to the control polymer was calculated. Tan delta was determined on a Rheometrics stress rheometer at 0.5 Hz. Each compounded polymer was also tested for rebound by employing the industry standard ball drop test.

EXAMPLE NO. 1

In a suitable reactor vessel, 2295 grams of a 33 percent styrene in hexane blend and 7983 grams of a 24.5 percent butadiene in hexane blend was added. There was also added 20.2 millimoles (3.73 cubic centimeters or "cc") of a 5.42M of 2-2'-di(tetrahydrofuryl) propane (a polar coordinator) and 25.2 millimoles (16.81 cc) of 1.5M butyl lithium as a polymerization initiator. The temperature in the reactor vessel was maintained at 49° C. for 3 hours. Approximately 5 Kg of the polymer cement was removed to be used as a control polymer in the ensuing tests.

To the remaining polymer in the reaction vessel was added 20.2 millimoles (4.09 grams) of diphenyl sulfoxide dissolved in 50 cc of dry toluene. After stirring for sixteen hours, the polymer was isolated by adding the cement to isopropyl alcohol containing 2,6-di-tert-butyl-para-cresol (DBPC) and drum drying. Analysis of this polymer showed 27.4 percent styrene content, 48.6 percent vinyl polybutadiene. The control polymer was found to have an average molecular weight of 112,700 g/mole, while the sulfoxide group endcapped polymer according to the invention was found to have an average molecular weight of 124,300 g/mole.

The control polymer (Control Polymer 1) and the invention polymer (Invention Polymer 1) were each compounded into conventional treadstock formulation. The treadstock formulation included 100 parts of the rubber being tested, 50 parts of ASTM N-339 carbon black per 100 parts rubber (phr), 3 phr zinc oxide, 1.8 phr sulfur, 2 phr stearic acid, 1 phr Santoflex 13 and 1 phr Santocure NS. This compound was then cured for 30 minutes at 150° C. Physical properties of each compound are reported in Table II hereinbelow.

TABLE II

| Hysteresis Properties of Rubber Compounds of Example No. 1 | | | |
|---|---|---|---|
| | | Control Polymer 1 | Invention Polymer 1 |
| tensile strength | 23° C. | 2946 | 2898 |
| percent elongation $^a$ | | 385 | 343 |
| ML$_4$ 100° C$^b$ | | 86.4 | 93.6 |
| rebound | 23° C. | 33.6 | 34.8 |
| | 65° C. | 56.6 | 59.0 |
| tan δ at | 24° C. | 0.2068 | 0.1776 |
| 7% elongation | 65° C. | 0.1352 | 0.1179 |
| Δ tan δ$^c$ | 24° C. | — | −14.1 |
| | 65° C. | — | −12.8 |

$^a$)percent elongation at break
$^b$)Mooney viscosity
$^c$)percent change from Control Polymer 1

With respect to the data reported in Table II, it is noted that Invention Polymer 1 showed a percent rebound of 34.8 and 59.0 at 23° C. and 65° C. respectively, while Control Polymer 1 showed a percent rebound of 33.6 and 56.6 respectively. The improvement in rebound would suggest a corresponding decrease in tan delta, which was confirmed by the tan delta data.

At both 24° C. and 65° C. tests, tan delta for Invention Polymer 1 was found to be superior to that of Control Polymer 1. The lower the tan delta number, the lower are the hysteresis properties of the sample.

These data show that the polymer prepared according to the invention by endcapping the SBR polymer with a sulfur containing end group, provided the result of a reduction in hysteresis in the elastomeric compound upon cure. Control Polymer 1 was found to have a tan delta of 0.2068 and 0.1352 at 24° C. and 65° C. respectively, while Invention Polymer 1 was found to have a tan delta of 0.1776 and 0.1179 respectively.

EXAMPLE NO. 2

A monomer blend of 0.69 Kg of 33 percent styrene in hexane and 3.75 Kg lbs. of 24.5 percent butadiene in hexane was prepared and cooled to 13° C. To this blend was added 20.6 cc of a 0.63M solution of tributyl tin lithium in tetrahydrofuran (THF) as a polymerization initiator. The temperature was held for 1.5 hours and then increased to 21° C. and then to 49° C. by increasing the temperature by 5.6° C. every 15 minutes. The resultant batch was sampled by removing approximately 2.27 Kg of the cement (Control Polymer 2). To the remaining cement was added 1.32 grams of di-para-tolyl sulfoxide, with stirring for 15 minutes. The endcapped polymer (Invention Polymer 2) was isolated by alcohol coagulation followed by drum drying.

Both Control Polymer 2 and Invention Polymer 2 were compounded with a conventional treadstock formulation as in Example No. 1. The rubber compositions were then analyzed, with data reported in Table III.

TABLE III

| Hysteresis Properties of Rubber Compounds of Example No. 2 | | | |
|---|---|---|---|
| | | Control Polymer 2 | Invention Polymer 2 |
| tensile strength | 23° C. | 3071 | 3248 |
| percent elongation$^a$ | | 321 | 329 |
| ML$_4$ 100° C.$^b$ | | 92.0 | 80.5 |
| rebound | 23° C. | 48.4 | 50.0 |
| | 65° C. | 68.0 | 70.0 |
| tan δ at | 24° C. | 0.1249 | 0.1103 |
| 7% elongation | 65° C. | 0.07939 | 0.07523 |
| Δ tan δ$^c$ | 24° C. | — | −11.7 |
| | 65° C. | — | −5.24 |

$^a$)percent elongation at break
$^b$)Mooney viscosity
$^c$)percent change from Control Polymer 2

EXAMPLE NO. 3

A monomer blend was prepared according to Example No. 2, with Control Polymer 3 being isolated and 1.56 grams of di-4-chlorophenyl sulfoxide being used to end-cap the remaining polymer (Invention Polymer 3). A rubber compound was prepared as in Example 2, with data being reported in Table IV.

TABLE IV

| Hysteresis Properties of Rubber Compounds of Example No. 3 | | | |
|---|---|---|---|
| | | Control Polymer 3 | Invention Polymer 3 |
| tensile strength | 23° C. | 2972 | 3093 |
| percent elongation$^a$ | | 305 | 297 |
| ML$_4$ 100° C.$^b$ | | 156.6 | 107.1 |
| rebound | 23° C. | 47.6 | 50.6 |
| | 65° C. | 66.6 | 70.4 |
| tan δ at | 24° C. | 0.1344 | 0.1109 |
| 7% elongation | 65° C. | 0.08717 | 0.06896 |
| Δ tan δ$^c$ | 24° C. | — | −17.5 |
| | 65° C. | — | −20.9 |

$^a$)percent elongation at break
$^b$)Mooney viscosity
$^c$)percent change from Control Polymer 3

EXAMPLE NO. 4

A monomer blend was prepared according to Example No. 2, with Control Polymer 4 being isolated and 0.93 grams of dibutyl sulfoxide being used to end-cap the remaining polymer (Invention Polymer 4). A rubber compound was prepared as in Example No. 2, with data reported in Table V.

TABLE V

Hysteresis Properties of Rubber Compounds of Example No. 4

|  |  | Control Polymer 4 | Invention Polymer 4 |
|---|---|---|---|
| tensile strength | 23° C. | 3249 | 3030 |
| percent elongation[a] |  | 295 | 306 |
| ML$_4$ 100° C.[b] |  | 137.7 | 118.8 |
| rebound | 23° C. | 47.8 | 47.8 |
|  | 65° C. | 67.2 | 69.4 |
| tan δ at | 24° C. | 0.1335 | 0.1269 |
| 7% elongation | 65° C. | 0.08626 | 0.08142 |
| Δ tan δ[c] | 24° C. | — | −4.94 |
|  | 65° C. | — | −5.61 |

[a] percent elongation at break
[b] Mooney viscosity
[c] percent change from Control Polymer 4

EXAMPLE NO. 5

A monomer blend was prepared according to Example No. 2, with Control Polymer 5 being isolated and 0.71 grams of methyl methylsulfinylmethyl sulfide being used to end-cap the remaining polymer (Invention Polymer 5). A rubber compound was prepared as in Example No. 2, with data reported in Table VI.

TABLE VI

Hysteresis Properties of Rubber Compounds of Example No. 5

|  |  | Control Polymer 5 | Invention Polymer 5 |
|---|---|---|---|
| tensile strength | 23° C. | 3199 | 2528 |
| percent elongation[a] |  | 300 | 273 |
| ML$_4$ 100° C.[b] |  | 144 | 123 |
| rebound | 23° C. | 44.6 | 45.4 |
|  | 65° C. | 64.6 | 65.2 |
| tan δ at | 24° C. | 0.1397 | 0.1305 |
| 7% elongation | 65° C. | 0.08640 | 0.07607 |
| Δ tan δ[c] | 24° C. | — | −6.59 |
|  | 65° C. | — | −12.0 |

[a] percent elongation at break
[b] Mooney viscosity
[c] percent change from Control Polymer 5

EXAMPLE NO. 6

The procedure of Example No. 2 was repeated except that the polymerization initiator was replaced by 13.6 cc of 12.27M THF and 8.06 cc of 1.61M butyl lithium. The same end-capping agent was employed, di-para-tolyl sulfoxide, and the polymer was compounded as above, with test data reported in Table VII, for Control Polymer 6 and Invention Polymer 6.

TABLE VII

Hysteresis Properties of Rubber Compounds of Example No. 6

|  |  | Control Polymer 6 | Invention Polymer 6 |
|---|---|---|---|
| tensile strength | 23° C. | 2572 | 2694 |
| percent elongation[a] |  | 304 | 303 |
| ML$_4$ 100° C.[b] |  | 56 | 69 |
| rebound | 23° C. | 41.4 | 45.2 |
|  | 65° C. | 55 | 60.8 |
| tan δ at | 24° C. | 0.2025 | 0.1547 |
| 7% elongation | 65° C. | 0.1396 | 0.1039 |
| Δ tan δ[c] | 24° C. | — | −23.6 |
|  | 65° C. | — | −25.6 |

[a] percent elongation at break
[b] Mooney viscosity
[c] percent change from Control Polymer 6

EXAMPLE NO. 7

The procedure of Example No. 3 was repeated except that the polymerization initiator was that of Example No. 6. The di-4-chlorophenyl sulfoxide of Example No. 3 was employed as an end-capping agent. The material was isolated and compounded as above, and the test data for Control Polymer 7 and Invention Polymer 7 is reported in Table VIII.

TABLE VIII

Hysteresis Properties of Rubber Compounds of Example No. 7

|  |  | Control Polymer 7 | Invention Polymer 7 |
|---|---|---|---|
| tensile strength | 23° C. | 2396 | 2620 |
| percent elongation[a] |  | 327 | 324 |
| ML$_4$ 100° C.[b] |  | 41.5 | 51.0 |
| rebound | 23° C. | 37.2 | 41.6 |
|  | 65° C. | 53.6 | 59.2 |
| tan δ at | 24° C. | 0.2326 | 0.1958 |
| 7% elongation | 65° C. | 0.1609 | 0.1280 |
| Δ tan δ[c] | 24° C. | — | −15.9 |
|  | 65° C. | — | −20.4 |

[a] percent elongation at break
[b] Mooney viscosity
[c] percent change from Control Polymer 7

EXAMPLE NO. 8

The procedure of Example No. 4 was repeated, including compounding, except that the polymerization initiator was that of Example No. 6. The dibutyl sulfoxide of Example No. 4 was used as an end-capping agent. Control Polymer 8 and Invention Polymer 8 were isolated as above, with test data reported in Table IX.

TABLE IX

Hysteresis Properties of Rubber Compounds of Example No. 8

|  |  | Control Polymer 8 | Invention Polymer 8 |
|---|---|---|---|
| tensile strength | 23° C. | 2507 | 2705 |
| percent elongation[a] |  | 316 | 323 |
| ML$_4$ 100° C.[b] |  | 51.5 | 50.5 |
| rebound | 23° C. | 39.2 | 38.6 |
|  | 65° C. | 55.0 | 53.8 |
| tan δ at | 24° C. | 0.2125 | 0.2143 |
| 7% elongation | 65° C. | 0.1523 | 0.1502 |
| Δ tan δ[c] | 24° C. | — | −0.85 |
|  | 65° C. | — | −1.38 |

[a] percent elongation at break
[b] Mooney viscosity
[c] percent change from Control Polymer 8

EXAMPLE NO. 9

The procedure of Example No. 5 was repeated, including compounding, except that the polymerization initiator was that of Example No. 6. The methyl methylsulfinylmethyl sulfide of Example No. 5 was used as an end-capping agent. Control Polymer 9 and Invention Polymer 9 were isolated as above, and test data is reported in Table X.

TABLE X

Hysteresis Properties of Rubber Compounds of Example No. 9

|  |  | Control Polymer 9 | Invention Polymer 9 |
|---|---|---|---|
| tensile strength | 23° C. | 2740 | 2540 |
| percent elongation[a] |  | 323 | 309 |
| ML$_4$ 100° C.[b] |  | 52.5 | 54.0 |
| rebound | 23° C. | 41.2 | 42.0 |
|  | 65° C. | 57.4 | 57.4 |
| tan δ at | 24° C. | 0.2100 | 0.2015 |
| 7% elongation | 65° C. | 0.1454 | 0.1334 |
| Δ tan δ[c] | 24° C. | — | −4.05 |
|  | 65° C. | — | −8.25 |

[a] percent elongation at break
[b] Mooney viscosity
[c] percent change from Control Polymer 9

It should now be clear from the foregoing examples and specification disclosure, that elastomer compounds according to the present invention are useful for providing improvements in hysteresis characteristics. These polymers exhibit improved hysteresis properties when compared to similar polymers prepared by similar means but lacking the sulfur-containing end groups. As a result, the vulcanizable compounds containing these polymers exhibit improved hysteresis properties which provide tread compounds improved rolling resistance in tires.

It is to be understood that the invention is not limited to the specific initiators, sulfur compounds, monomers, polar coordinators or solvents disclosed herein, except as otherwise stated in the specification. Similarly, the examples have been provided merely to demonstrate practice of the subject invention and do not constitute limitations of the invention. Those skilled in the art may readily select other monomers and process conditions, according to the disclosure made hereinabove.

Thus, it is believed that any of the variables disclosed herein can readily be determined and controlled without departing from the scope of the invention herein disclosed and described. Moreover, the scope of the invention shall include all modifications and variations that fall within the scope of the attached claims.

What is claimed is:

1. A method of preparing an elastomer having reduced hysteresis properties comprising the steps of:
   reacting an anionic polymer having at least one functional site, with about one equivalent of a sulfoxide compound selected from the group consisting of diphenyl sulfoxide, dibutyl sulfoxide, di-para-tolyl sulfoxide, di-4-chlorophenyl sulfoxide and methyl methylsulfinylmethyl sulfide; and,
   curing said adduct in the presence of a suitable cure catalyst,
   wherein said anionic polymer is formed from a monomer solution comprising a monomer component selected from the group consisting of conjugated dienes having from about 4 to about 12 carbon atoms, monovinyl aromatic monomers having from 8 to about 18 carbon atoms, trienes and mixtures thereof.

2. A method of preparing an elastomeric compound as set forth in claim 1, further comprising the step of compounding from about 95 to about 50 parts by weight of said adduct with from about 5 to about 50 parts by weight of a conventional treadstock formulation comprising a rubber component and from about 20 to about 100 parts by weight of carbon black per hundred parts of said rubber component prior to said step of curing.

3. A method of preparing an elastomeric compound as set forth in claim 2, wherein said rubber component of said treadstock formulation is selected from the group consisting of natural rubber, synthetic rubber and blends thereof.

4. A method of preparing an elastomeric compound as set forth in claim 1, further comprising the initial step of preparing said anionic polymer by polymerizing said monomer solution in the presence of a suitable polymerization initiator.

5. A method of preparing an elastomeric compound as set forth in claim 4, wherein said polymerization initiator is selected from the group consisting of butyl lithium, s-butyl lithium, t-butyl lithium, tributyl tin lithium, allyl lithium, methyl lithium and dodecyl lithium.

6. A method of preparing an elastomeric compound as set forth in claim 5, wherein said anionic polymer is a living polymer having at least one carbonlithium bond.

7. A method of preparing an elastomeric compound as set forth in claim 4, wherein said monomer solution further comprises a solvent selected from the group consisting of hexane, cyclohexane and benzene.

8. A method of preparing an elastomeric compound as set forth in claim 1, wherein said anionic polymer is selected from the group consisting of diene homopolymers and copolymers thereof with monovinyl aromatic polymers.

9. A method of preparing an elastomeric compound as set forth in claim 1, wherein said cure catalyst is sulfur.

* * * * *